United States Patent [19]

Neumeister

[11] 4,416,602
[45] Nov. 22, 1983

[54] INJECTION MOLDING APPARATUS FOR MANUFACTURING ARTICLES FROM DIFFERENT TYPES OF PLASTIC MATERIAL

[75] Inventor: Ernst Neumeister, Stein, Fed. Rep. of Germany

[73] Assignee: Wilhelm Rogg Kunststoff-Metallistierung, Nuremberg, Fed. Rep. of Germany

[21] Appl. No.: 305,382

[22] Filed: Sep. 24, 1981

[30] Foreign Application Priority Data

Oct. 2, 1980 [DE] Fed. Rep. of Germany ....... 3037252

[51] Int. Cl.³ .............................................. B29F 1/12
[52] U.S. Cl. ................... 425/130; 264/328.7; 264/328.8; 425/573; 425/577
[58] Field of Search ................. 264/328.8, 255, 328.7; 425/130, 573, 577

[56] References Cited

U.S. PATENT DOCUMENTS

| 4,275,030 | 6/1981 | Mares | 264/328.7 X |
| 4,335,068 | 6/1982 | Hemery | 264/328.8 X |

FOREIGN PATENT DOCUMENTS

| 2802237 | 7/1978 | Fed. Rep. of Germany | 425/130 |
| 1234310 | 10/1960 | France | 425/130 |
| 2462261 | 3/1981 | France | 264/255 |
| 53-64272 | 6/1978 | Japan | 264/328.8 |

*Primary Examiner*—Thomas P. Pavelko
*Attorney, Agent, or Firm*—Holman & Stern

[57] ABSTRACT

In an injection mold apparatus for manufacturing molded bodies from two types of plastic, a first and third injection units (4 and 6) are connected to a single mold cavity, and a core piece (15) which is movable back and forth occupies a region of the mold cavity when said core is in the blocking position, and said core in this position separates (by closing off) a first mold cavity region (associated with the first injection unit) and the entrance opening of material coming from the third injection unit (6) into the mold cavity from a second mold cavity region (which is connected to the first injection unit (4), whereby first the second mold cavity region is filled from the first injection unit and then, after the core (15) is drawn back, the region of the mold cavity initially occupied by said core, and the first mold cavity region, are filled from the third injection unit, and whereby the core has a recess, the improvement comprising providing the recess (37) in the blocking region of the core (15), whereby when the core is in the blocking position said recess is in fluid communication with the second mold cavity region, and the entrance opening of material coming from the first injection unit (6) lies in the mold cavity when the core (15) is in the blocking position, so that parts which are sequentially injection molded in the two mold cavity regions are quite securely held together at their junction position, to form a combined molded piece or molded shape, reference being made to the drawings.

10 Claims, 6 Drawing Figures

INJECTION MOLDING APPARATUS FOR MANUFACTURING ARTICLES FROM DIFFERENT TYPES OF PLASTIC MATERIAL

FIELD OF THE INVENTION

The invention concerns an injection molding apparatus for the manufacture of molded bodies from at least two types of plastic, in which mold two injection units are connected to a single mold cavity. A core piece which is moveable back and forth occupies a region of the mold cavity when said core is in the blocking position, and said core in this position separates (by blocking off) a first mold cavity region (associated with the first injection unit) and the entrance opening of material coming from the first injection unit into the mold cavity from a second mold cavity region (which is connected to the second injection unit). Thus, first the second mold cavity region is supplied from the second injection unit and then, after the core is withdrawn (pulled back), the region of the mold cavity initially occupied by said core, and the first mold cavity region, are supplied from the first injection unit, and the core forms a recess.

BACKGROUND OF THE INVENTION

The known injection mold of German Pat. No. 885,152 serves only to injection mold two plates or thinner layers (sheet of film) from different types of plastic. For this purpose a large and projecting core occupies a major part of the mold cavity in the blocking position of said core, i.e., in the one position. When the core is drawn back, the region thus opened up by the core is then filled with plastic via the entrance opening which had been blocked off by the core. With this injection mold the mold cavity space is filled by the core, and after the core is removed the molding material is injected directly into the mold cavity space to form the shaped part. Under this arrangement it is not possible to have a complex shaped mold region adjacent to another complex shaped mold region filled with a first type of plastic whereby the former can be filled with a second type of plastic.

DESCRIPTION OF THE INVENTION

Thus it was an underlying problem of the invention to devise an injection mold of the type initially described supra, in which two or more complex shaped mold regions can be filled with plastic materials of different types with a continuous (directly linked) molded piece being produced, wherein the shape of the subsequently (after the first injection) molded piece is independent of the shape of the core, and whereby the pieces sequentially injection-molded in the two mold cavity regions are sufficiently securely held in a unit at the junction point of the two different plastic materials, to form a combined molded piece or shape. The inventive injection mold apparatus which solves this problem is characterized in that the recess is provided in the blocking region of the core and is in fluid communication with the second mold cavity region when the core is in the blocking position, and the entrance opening leading from the first injection unit lies in the mold cavity when the core is in the blocking position.

With the inventive injection mold, as with the prior art, the second mold cavity region is filled by the second injection unit when the core is in the closing-off position. After the core is drawn back, not only the region previously occupied by the core but also the region of the mold cavity previously blocked off by the core is still open and empty, and is available to be filled by the first injection unit. The shape of the first (or currently first) blocked-off mold cavity region may be completely independent of the shape of the core, that is, it may be of any desired complexity. It is thus possible to injection mold a molded piece comprised of parts of arbitrarily complex shapes, and made of multiple types of plastic.

The molding together of different plastics presents the problem of arranging for the finished molded shape to hold together sufficiently securely. In some cases two flat (layered) injection molded types of plastic which are molded together will not hold together adequately. Since according to the invention two different types of plastic are injection molded together, an important factor in the invention is the conditions enabling the molded-together plastic regions to hold together sufficiently securely. These conditions are namely that the recess or out-bulge is already filled with plastic when the injection is made into the second mold cavity. The "lug" formed in the recess has material injected surrounding and/or into it when the injection from the first injection unit occurs, thus producing a particularly intimate, strongly engaged coupling of the two plastic materials.

It is particularly advantageous if the core in its blocking position interrupts a channel connecting the two outward extending mold cavity regions. Injection molds in which outward extending mold cavity regions are connected by a channel and cross channels (runners) are themselves known. They are used, for example, in manufacturing groups of calculator or typewriter keys connected by a gridwork, wherewith the keys originate in the outward extending mold cavity regions and the gridwork originates in the channels and cross channels. According to the present invention, when the injection from the second injection unit is taking place one of the outward extending mold cavity regions along with its adjoining channel segment and cross channel is blocked off by the core, whereby after the core is drawn back said formerly blocked-off spaces become filled with a first type of plastic, from the first injection unit.

According to one embodiment, a channel has joined to it, in addition to other outward extending mold cavity regions, two additional mold cavity regions. The segment of the channel from which the two additional cross channels branch out is separable from the remainder of the channel as the result of being blocked off by two cores, and is connected to the first injection unit. Further, here the entrance opening from the first injection unit into the mold cavity (here, into the channel) is isolated by the core such that the cavity and channel cannot be filled or disturbed by the plastic from the first injection unit.

It is preferred for the core when in the blocking position to cover the entrance opening from the first injection unit into the mold cavity. With this configuration it is not necessary to provide two cores to block off the first entrance opening from the plastic coming from the second injection unit. The combination of the covering of the first entrance opening and the simultaneous shutting-off action of the core is preferred, because in this case a single core performs both functions.

It is also particularly advantageous if the core when in the blocking position covers a gridwork cross channel which leads to an outward extending mold cavity region. With this embodiment the core accomplishes the task of directly covering the entrance opening to the first outward extending mold cavity region. This configuration is particularly preferred in a combination whereby the core divides (i.e., interrupts) a channel and also covers the entrance opening of flow coming from the first injection unit.

It is possible to move the core in a line with the injection direction, up to the entrance opening of flow coming from the first injection unit. However it is particularly advantageous for the direction of the back and forth movement of the core to be transverse to the injection direction of the first injection unit. When the core is given this direction of movement, highly complex shapes of the mold cavity are possible, the interlocking of adjacent plastic masses is facilitated, and the structure of the injection mold as a whole is simplified. As a rule the injection mold is comprised of two tool parts which are movable with respect to each other, with the injection direction preferably being perpendicular to the direction of movement of the tool parts. The movement mechanism of the core is simplified if the direction of movement of the core coincides with that of the tool parts.

It is further particularly advantageous if the core is disposed in a fixed tool part (there being another tool part which is movable back and forth). This configuration simplifies the control of the movement of the core.

A particularly advantageous embodiment of the invention results if the blocking, movable core is present in combination with a transport mechanism for moving partially completed molded bodies from a first injection station to a second injection station. Under this arrangement, different types of plastic material are injected from different injection units at the different injection stations, whereby in at least one injection station different types of plastic material are injected from different injection units, with the use of a core according to the invention.

The invention envisions an injection mold apparatus having an additional injection unit, which apparatus enables the injection of multiple plastic materials of different colors or properties with any commonly used single-color injection molding apparatus. Using the invention, two to eight or even more plastic materials of different colors or properties may be injected in a single work pass on a relatively small apparatus.

Using the invention it is possible to employ a lug with a framework configuration, whereby the desired molded pieces, e.g. keys such as typewriter keys, are produced by injection molding in an arrangement rigidly linked by thin cross pieces, with the molded pieces in the form of keys provided with symbols in different colors. Since the distances separating the molded pieces (keys) from each other match the distances separating the openings for the keys in the housing of a corresponding calculator or typewriter, the keys can be mounted (on the keyboard) as a unit, by punching out the cross pieces or by similar techniques. The configuration of the framework is made such that a magazine feed can be employed, to permit automation.

Using the inventive injection mold apparatus, molded pieces, such as keys, having different symbols of different colors or materials may be directly injection molded in a molded-together framework configuration or "shell." Molded pieces which differ in color or material, such as knobs, can be injection molded within a framework or shell, whereby each such molded piece is formed from a combination of plastics of different colors or types. With the inventive injection mold apparatus various thermoplastic articles in various materials and colors can be produced in a single work pass on any known simple injection molding machine.

BRIEF DESCRIPTION OF THE DRAWINGS

A preferred embodiment of the invention is shown in the drawings.

DESCRIPTION OF THE PREFERRED EMBODIMENTS

Figure 1:
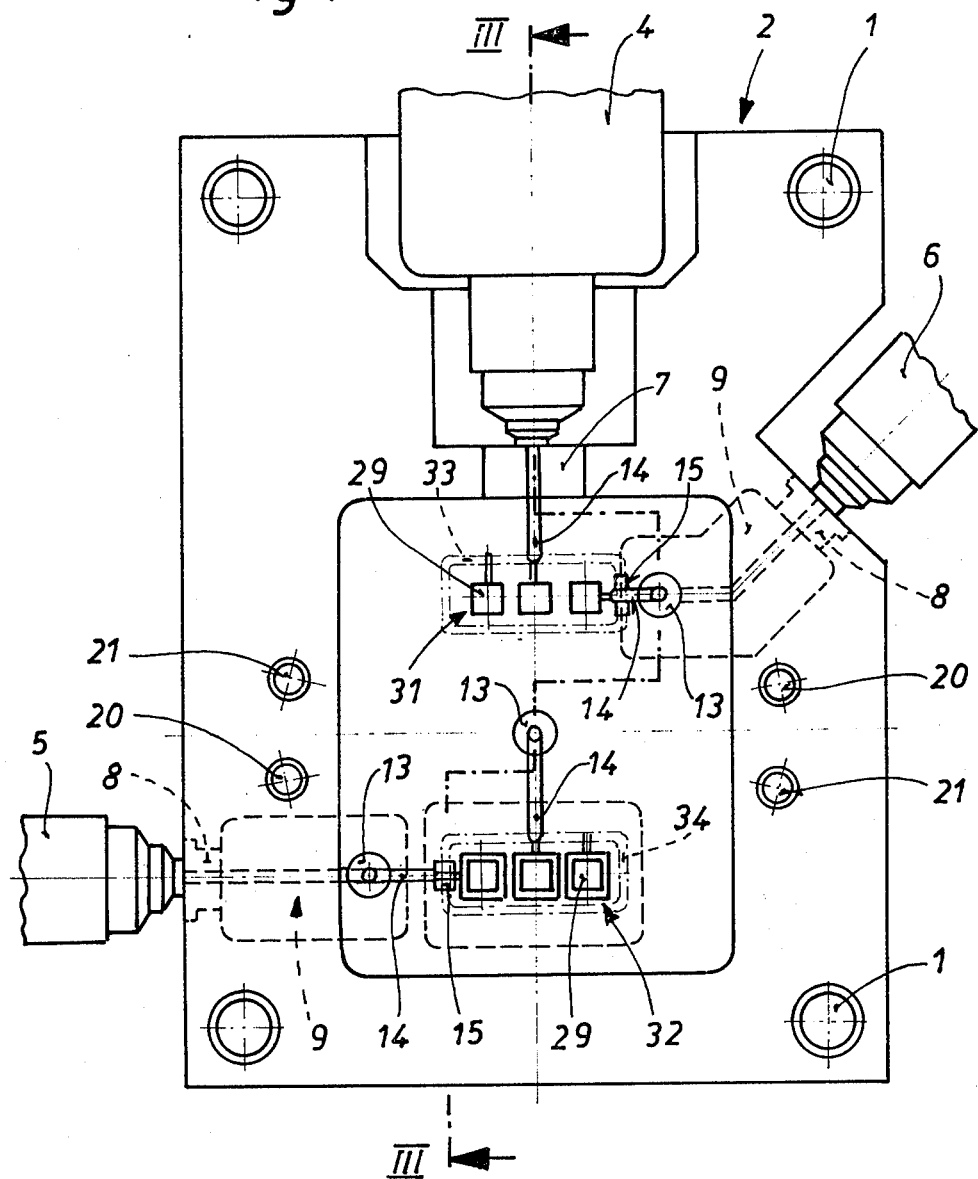
FIG. 1 is a front view of an injection mold for manufacture of molded bodies from different types of plastic material.
Figure 2:
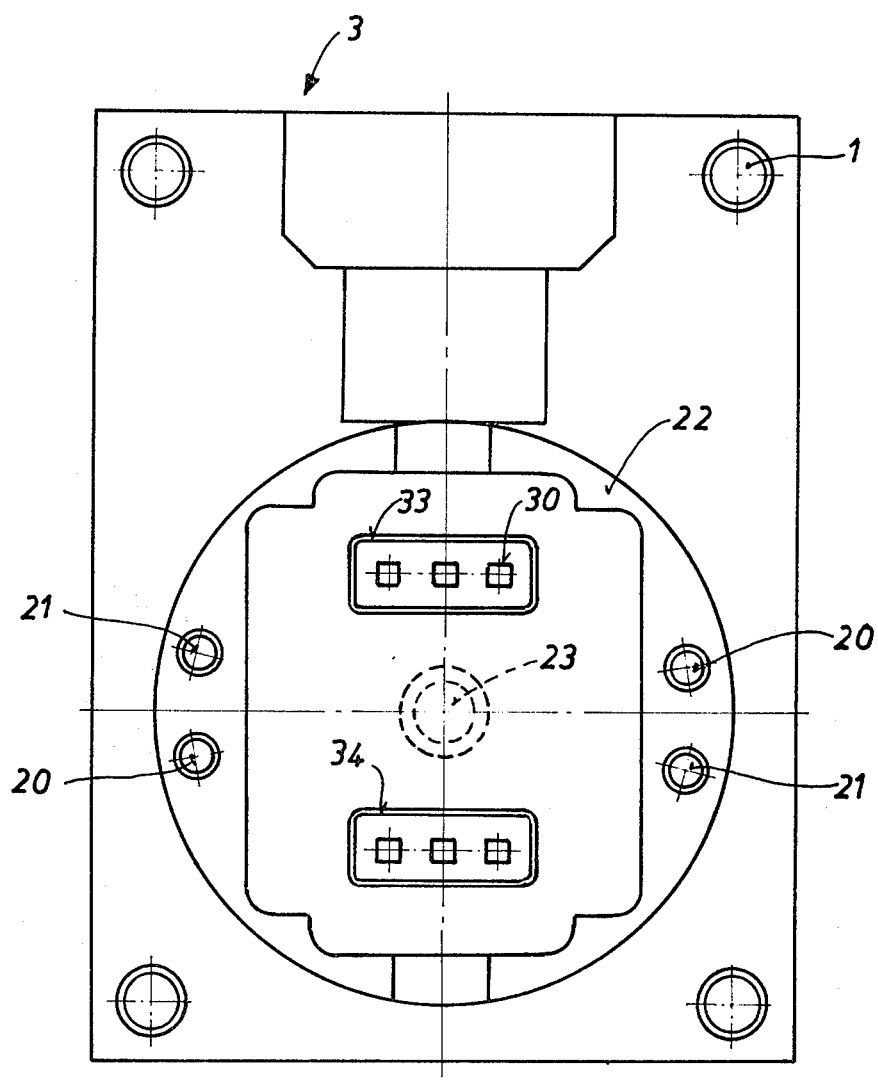
FIG. 2 is a rear view of the mold of FIG. 1.

The injection mold apparatus of the drawings has four horizontal guide posts 1 which are fixed in a rectangular configuration. An outer tool part 2 is fixed to and rests on the guide posts, and a base tool part 3 is slidably supported by said posts. Outer tool part 2 has four injection units of which the first unit 4, second unit 5 and third unit 6 are shown, and one of which extends in the direction of the guide posts and is not shown. These units are of known structure and each can deliver a different plastic having a different color or other properties. The first injection unit 4 delivers the plastic through a feedhead (sprue) strip 7. The second injection unit 5 and third injection unit 6 deliver through respective feed (sprue) bushes 8. Each of these feed bushes 8 adjoins a respective heating device 9 having a heating channel 10 (FIG. 3) surrounded by a heat insulating space 11 and holding electrical heating modules 12. Nozzles 13 are provided for the heating channels. The plastic material then passes from channels 14 into the mold cavity. These channels 14 run to the front side of the outer tool part 2.

Figure 3:
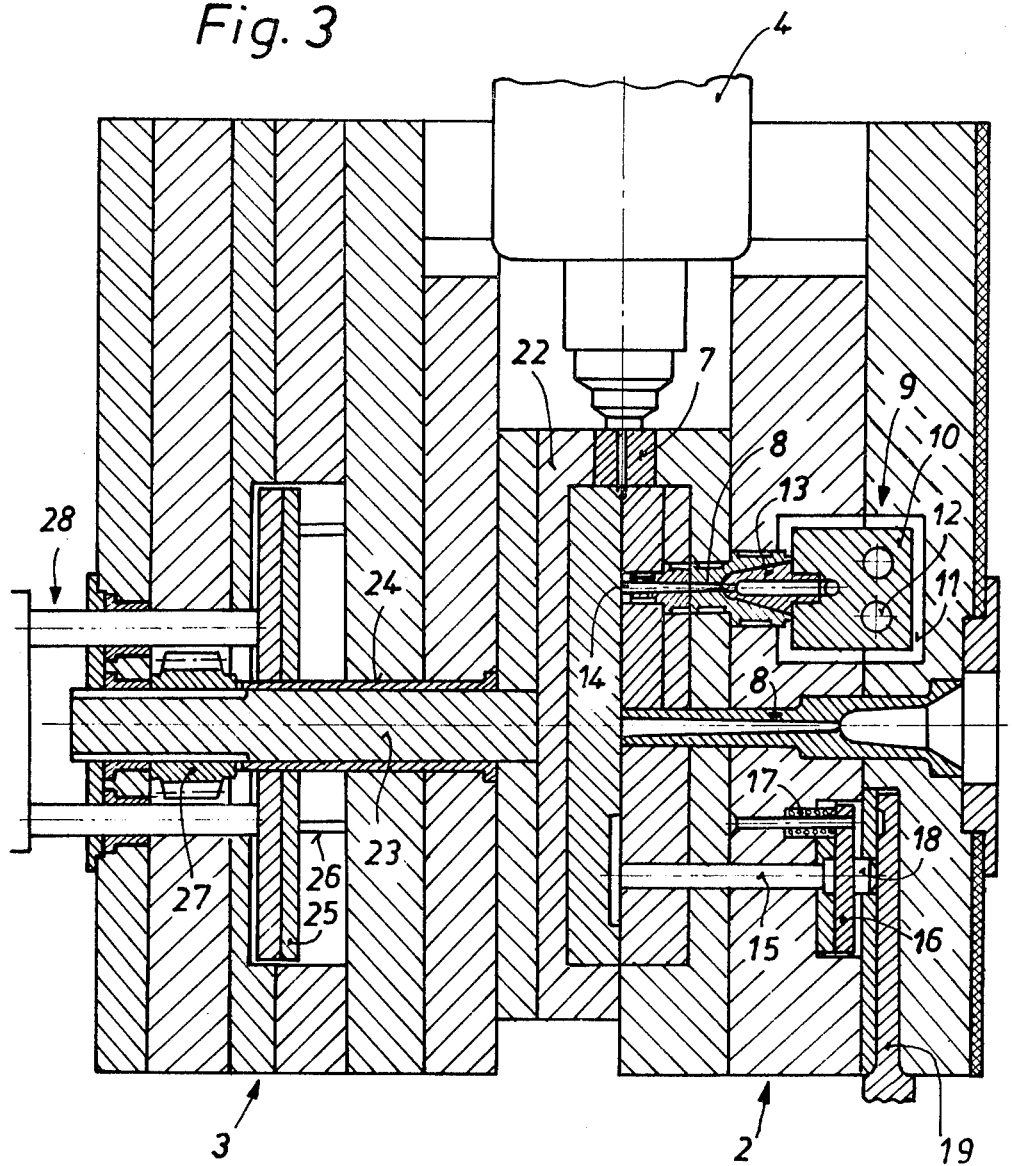
FIG. 3 is a cross section through line III—III of FIG. 1.

The outer tool part 2 accommodates slideable cores 15, one of which is shown in FIG. 3. At the rear end of each core 15 it is attached to a disc 16 which is slidably guided in a hollow space within the outer tool part. Disc 16 is acted on by a spring 17 which is set up to slide the disc and thus the core 15 in the direction of the guide posts 1 away from the base tool part 3. On the rear side of disc 16 there is a nub 18 which glides against a sliding control bar 19 having a recess on its side turned toward said hub. When the control bar 19 is shifted such that said recess lies opposite the extension of the nub 18, then the core 15 can move rearward. The outer tool part has two centering rods 20 each of which is associated with a corresponding bushing 21 in the base tool part; and the outer tool part also has two such bushings 21 associated with corresponding centering rods 20 of the base tool part.

The base tool part 3, which similarly to the outer tool part 2 is a combination of several plates, has a rotating plate 22 which faces the outer tool part. The rotating plate 22 rests against a shaft 23 rotatable in a bushing 24 which is fixed to the interior of the body of the base tool part. The body of said part 3 also has a hollow space which accommodates an ejector plate 25 which has multiple ejector bars 26 on it (of which only two are shown). The shaft 23 bears a gear wheel 27 which is rotatable in both directions by a drive means (not shown). Extending backward from the ejector plate 25 are bars which belong to an ejector mechanism 28 and which are moveable back and forth by means of a drive means (not shown). (Also not shown is the drive means by which the base tool part is moveable back and forth on the guide posts 1.)

On the side of the outer tool part 2 facing the base tool part there are mold cavities 29 corresponding to associated mold pieces 30 on the base tool part which penetrate into the mold cavities when the mold is closed, leaving the intended space in the mold cavities for the plastic molding material to fill. As may be seen from the drawings, there are two groups of mold cavities. The first mold cavity group 31 is associated with first injection unit 4 and third injection unit 6, and the second mold cavity group 32 is associated with second injection unit 5 and a fourth unit (not shown). The so-called "first-injection" moldings are produced in first mold cavity group 31 of mold cavities 29. These moldings are removed from the mold cavities 29 of the first group 31 while sitting on the mold pieces, and are swung down thus to the mold cavities of the second group 32 in which the final injection molding will be carried out.

When the mold is closed there is a first and a second ring-shaped closed channel (33 and 34, respectively) around each of the two groups 31 and 32. These channels are formed in the base tool part 3 in the present embodiment, and are shown there as dot-dashed lines. They may alternatively be provided in the outer tool part 2. The two leftward mold cavities of the first mold cavity group 31 of FIG. 1 are fed from the first injection unit 4 and connect to the first ring-shaped channel 33 via cross channels (runners). The most rightward mold cavity in the same group 31 is also connected to the first ring-shaped channel 33 via a cross channel, but said cavity is fed from the third injection unit 6. A slidable core 15 is provided. When the core is in the closed position it blocks the passage from the ring-shaped channel 33 to the most rightward mold cavity, and also the passage from the third injection unit 6 to the most rightward mold cavity. In a first injection step the two leftward mold cavities and nearly the entire first channel 33 are filled with plastic material from the first injection unit 4. Then the core 15 is moved backward, whereupon the most rightward mold cavity is filled from the third injection unit 6 and the rest of first channel 33 is also filled. The first channel 33 and the cross channels from it to the mold cavities form a "framework" for holding the first-injection moldings which have been formed in the mold cavities 29 of the first group 31. This framework is removed and discarded after the first-injection moldings are taken out of the mold cavities 29 of the first group 31, and before said moldings are inserted in the mold cavities of the second group.

The second channel 34 surrounding the mold cavities 29 of the second mold cavity group 32 is connected to the two rightward mold cavities via cross channels, and is fed from the fourth or central injection unit (not shown). The second injection unit 5 connects to second channel 34 and the most leftward mold cavity of second mold cavity group 32 with another core 15 which can block the most leftward mold cavity from the channel and from the second injection unit 5. In a first injection step, with core 15 in the closed position, the two rightward mold cavities 29, the cross channels leading to these, and the greater part of second channel 34 are all filled from the fourth (central) injection unit. Then core 15 is moved backward, and the most leftward mold cavity, the cross channel leading to said cavity, and the rest of second channel 34 are all filled from the second (left) injection unit 5. This results in three final injection moldings which are held together by a framework formed in second channel 34 and the cross channels. This final product comprised of the final injection moldings and the "gridwork" or framework is ejected.

Figure 4:
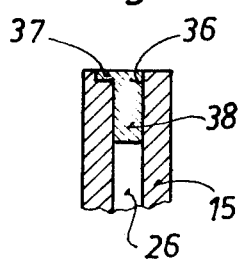
FIG. 4 is a cross section of a core.
Figure 5:
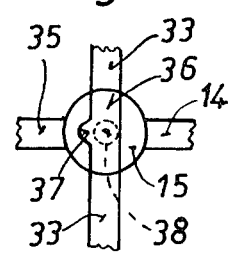
FIG. 5 is a schematic top view of the core of FIG. 4 and adjoining channels.

As shown schematically in FIGS. 4 and 5, the core 15 blocks off a first channel 33, i.e. at one spot it shuts off the channel which leads to the other mold cavities (or chambers) or projecting regions of the mold cavities. Core 15 also blocks the fluid communication in a cross channel 35 between said cross channel and channel 14 leading to an injection unit. (Cross channel 35 also leads to another mold cavity.) In the process, core 15 takes up the entire space in a region of first channel 33 and cross channel 35 which will later be part of the injection molded product, e.g. part of the framework of the product.

The structure of core 15 is also such that the material which passes into first channel 33 in the first injection step engages around the back of or intermeshes with the material which passes via channel 14 into the region opened up by the core and into cross channel 35, in the second injection step. In particular, the core 15 has a lower passage 36 in its end region which connects the arms of first channel 33 which are separated by the core; this passage further forms a bulge 37. Extending from the passage 36 the core 15 has a hollow 38 which is closed off on the bottom by an ejector bar 26. The passage 36, bulge 37, and hollow 38 are filled with the plastic material which flows in through first channel 33. The regions originating in the passage 36 and the hollow 38, after ejector bar 26 and core 15 are withdrawn backward, are surrounded by the plastic material which flows in via channel 14.

Figure 6:
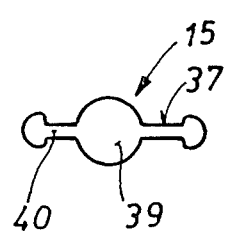
FIG. 6 is a top view of a different core.

FIG. 6 shows schematically a second embodiment of a different core 15 which not only has a blocking and space-protecting function but also acts to couple together two different types of plastic material, as a consequence of its configuration. The core 15 has a middle region which effects blocking and which occupies space. Side arms 40 extend from this middle region 39. These arms widen at their free ends. It is clear that plastic material surrounding a core according to FIG. 6, and plastic material later occupying the space filled by this core, will interlock. For this purpose each arm 40 further has a bulge 37.

I claim:

1. In an injection mold apparatus for manufacturing molded bodies from at least two types of plastic, in which apparatus two injection units are connected to a single mold cavity, and a core piece which is movable back and forth occupies a region of the mold cavity when said core is in the blocking position, and said core in this position separates (by blocking off) a first mold cavity region (associated with the first injection unit) and the entrance opening of material coming from the first injection unit into the mold cavity from a second mold cavity region (which is connected to the second injection unit), whereby first the second mold cavity region is filled from the second injection unit and then, after the core is withdrawn, the region of the mold cavity initially occupied by said core, and the first mold cavity region, are filled from the first injection unit, and whereby the core has a recess;

the improvement comprising that the recess is provided in the blocking region of the core and is in fluid communication with the second mold cavity region when the core is in the blocking position, and the entrance opening of material coming from the first injection unit in the mold cavity lies near the core when the core is in the blocking position.

2. In an injection mold apparatus for manufacturing molded bodies from at least two types of plastic, in which apparatus two injection units are connected to a single mold cavity, and a core piece which is movable back and forth occupies a region of the mold cavity when said core is in the blocking position, and said core in this position separates (by blocking off) a first mold cavity region (associated with the first injection unit) and the entrance opening of material coming from the first injection unit into the mold cavity from a second mold cavity region (which is connected to the second injection unit), whereby first the second mold cavity region is filled from the second injection unit and then, after the core is withdrawn, the region of the mold cavity initially occupied by said core, and the first mold cavity region, are filled from the first injection unit, and whereby the core has a recess; the improvements comprising:

that the recess is provided in the blocking region of the core and is in fluid communication with the second mold cavity region when the core is in the blocking position, and the entrance opening of material coming from the first injection unit in the mold cavity lies near the core when the core is in the blocking position;

that the mold cavity is subdivided into at least two shaped cavity regions connected by at least one fluid-flow framework-forming channel, and that when the core is in its blocking position it interrupts at least one said framework channel; so that the manufactured molded bodies are joined by a framework of a different type of plastic.

3. The improvement of claim 2 wherein said cavity regions are connected by a plurality of fluid-flow framework-forming channels, at least two of which intersect, and wherein a movable recessed core is arranged at such point of intersection so that said core may block and direct fluid flow into various of the arms forming said intersection.

4. The improvement of claim 2 or 3 wherein said framework-forming channel blocked by said core connects two outlying shaped mold cavity regions.

5. The improvement of claim 2 or 3 wherein said framework-forming channel blocked by said core is a cross-channel which leads to an outlying mold cavity region.

6. The improvement of claim 1 or 2 or 3 wherein a heating arrangement is provided between the first injection unit and the entrance opening into the mold cavity of material coming from said first injection unit.

7. The improvement of claim 1 or 2 or 3 wherein the direction of the back and forth movement of the core is transverse to the injection direction of the first injection unit.

8. The improvement of claim 1 or 2 or 3 wherein the core is disposed in a fixed outer tool part, there being another base tool part which is movable back and forth.

9. The improvement of claim 1 or 2 or 3 wherein the blocking, movable core is present in combination with a transport mechanism for moving partially completed molded bodies from one injection station to another injection station.

10. The improvement of claim 1, 2 or 3 wherein the recess in said core is shaped so that it forms a spigot or a socket for an inflexible joint between said at least two types of plastic.

* * * * *